(12) United States Patent
Gunyuzlu et al.

(10) Patent No.: US 11,907,411 B2
(45) Date of Patent: Feb. 20, 2024

(54) SECURE OPERATING MODES FOR COMPUTING DEVICES

(71) Applicant: HEWLETT-PACKARD DEVELOPMENT COMPANY, L.P., Spring, TX (US)

(72) Inventors: Mason Andrew Gunyuzlu, Spring, TX (US); Robert Stephen Craig, Spring, TX (US); Tevin Richards, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/777,843

(22) PCT Filed: Dec. 9, 2019

(86) PCT No.: PCT/US2019/065156
§ 371 (c)(1),
(2) Date: May 18, 2022

(87) PCT Pub. No.: WO2021/118520
PCT Pub. Date: Jun. 17, 2021

(65) Prior Publication Data
US 2022/0414271 A1 Dec. 29, 2022

(51) Int. Cl.
*G06F 21/83* (2013.01)
*G06F 21/31* (2013.01)
*G06F 21/74* (2013.01)

(52) U.S. Cl.
CPC .............. *G06F 21/83* (2013.01); *G06F 21/31* (2013.01); *G06F 21/74* (2013.01)

(58) Field of Classification Search
CPC ............ G06F 21/83; G06F 21/74; G06F 21/31
See application file for complete search history.

(56) References Cited

U.S. PATENT DOCUMENTS

| | | | |
|---|---|---|---|
| 5,097,506 A * | 3/1992 | Kaiser, Jr. | G06F 21/31 726/19 |
| 5,173,940 A * | 12/1992 | Lantz | G06F 21/84 726/19 |
| 5,355,414 A | 10/1994 | Hale et al. | |
| 5,402,492 A | 3/1995 | Goodman et al. | |
| 5,537,544 A * | 7/1996 | Morisawa | G06F 21/83 726/19 |
| 5,748,888 A | 5/1998 | Angelo et al. | |

(Continued)

*Primary Examiner* — Madhuri R Herzog
(74) *Attorney, Agent, or Firm* — Knobbe, Martens, Olson & Bear, LLP

(57) ABSTRACT

Example computing devices that are enabled to enter secure operating modes are provided. An example computing device includes a main processor to run an operating system enabled to establish communication from an external device to the main processor via a hardware interrupt handler when the external device is connected to the computing device. The computing device further includes a keyboard controller to detect a lock keystroke sequence at a keyboard, and, in response to detecting the lock keystroke sequence, cause the main processor to halt the operating system and to enter a secure operating mode in which communication from the external device to the main processor via the hardware interrupt handler is blocked.

11 Claims, 4 Drawing Sheets

(56) References Cited

U.S. PATENT DOCUMENTS

| | | | | |
|---|---|---|---|---|
| 6,125,236 | A * | 9/2000 | Nagaraj | G06F 13/387 |
| | | | | 707/999.107 |
| 6,550,010 | B1 * | 4/2003 | Link, II | G06F 21/31 |
| | | | | 713/168 |
| 9,026,773 | B2 | 5/2015 | Zimmer et al. | |
| 2003/0018892 | A1 | 1/2003 | Tello | |
| 2003/0041248 | A1 | 2/2003 | Weber et al. | |
| 2004/0123118 | A1 * | 6/2004 | Dahan | G06F 21/74 |
| | | | | 712/E9.082 |
| 2005/0057699 | A1 | 3/2005 | Bowser | |
| 2009/0292847 | A1 * | 11/2009 | Henry | G06F 21/82 |
| | | | | 710/261 |
| 2014/0223542 | A1 * | 8/2014 | Hicks | G06F 21/45 |
| | | | | 726/16 |
| 2020/0167303 | A1 * | 5/2020 | Kim | G06F 13/4286 |

* cited by examiner

NON-TRANSITORY MACHINE-READABLE
STORAGE MEDIUM
300

LOCK SIGNAL RECEIPT DETECTION
INSTRUCTIONS
310

INTERRUPT SIGNAL TRANSMISSION
INSTRUCTIONS
320

UNLOCK SIGNAL RECEIPT DETECTION
INSTRUCTIONS
330

RELEASE SIGNAL TRANSMISSION
INSTRUCTIONS
340

FIG. 3

SECURE OPERATING MODES FOR COMPUTING DEVICES

BACKGROUND

A lock screen may protect a computing device from unauthorized access by an intruder. A lock screen fills the display of a computing device and prompts a would-be user to enter a password and/or select a user account before the lock screen provides access to the computing device. A lock screen may be activated automatically when peripheral devices of the computing device are idle for a period of time or upon manual activation by a user.

BRIEF DESCRIPTION OF THE DRAWINGS

FIG. 3 is a schematic diagram of an example non-transitory machine-readable storage medium comprising instructions to cause a computing device to enter and exit a secure operating mode.

DETAILED DESCRIPTION

Although a lock screen may provide a degree of protection against unauthorized access to a computing device, the protection provided by a lock screen may be circumvented by the connection of an external device into the computing device. For example, connecting an external device to a computing device may initiate a hardware interrupt which provides direct access to the memory of the computing device in what may be termed a direct memory access (DMA) attack. The lock screen may be implemented entirely in software, and thus an intruder may be able to change the behaviour of the lock screen or otherwise gain access to the computing device through a DMA attack. As another example, an external device may mimic a peripheral device, such as a keyboard, and may rapidly generate keyboard scan codes in an attempt to breach the lock screen password. Other external devices may interact with other communication interfaces of the computing device, such as near-field communication (NFC) interfaces, Wi-Fi interfaces, or ethernet interfaces, to gain access to the computing device.

The present disclosure provides example computing devices that are enabled to enter secure operating modes which may provide protection against unauthorized access from external devices. As described herein, a computing device has a communication interface controller, such as a keyboard controller, which causes the computing device to enter a secure operating mode when a "lock" signal is received through a communication interface. In the secure operating mode, the computing device may block or disable malicious communications from external devices connected to the computing device, for example, by referencing an interrupt descriptor table that references instructions that are safe to execute when an external device is connected to the computing device. That is, the computing device may lookup a pointer in an interrupt descriptor table that points to a memory location that stores instructions for execution when a particular external device is connected to the computing device. Thus, when in the secure operating mode, a computing device is provided with a layer of security against attacks from external devices.

Figure 1:
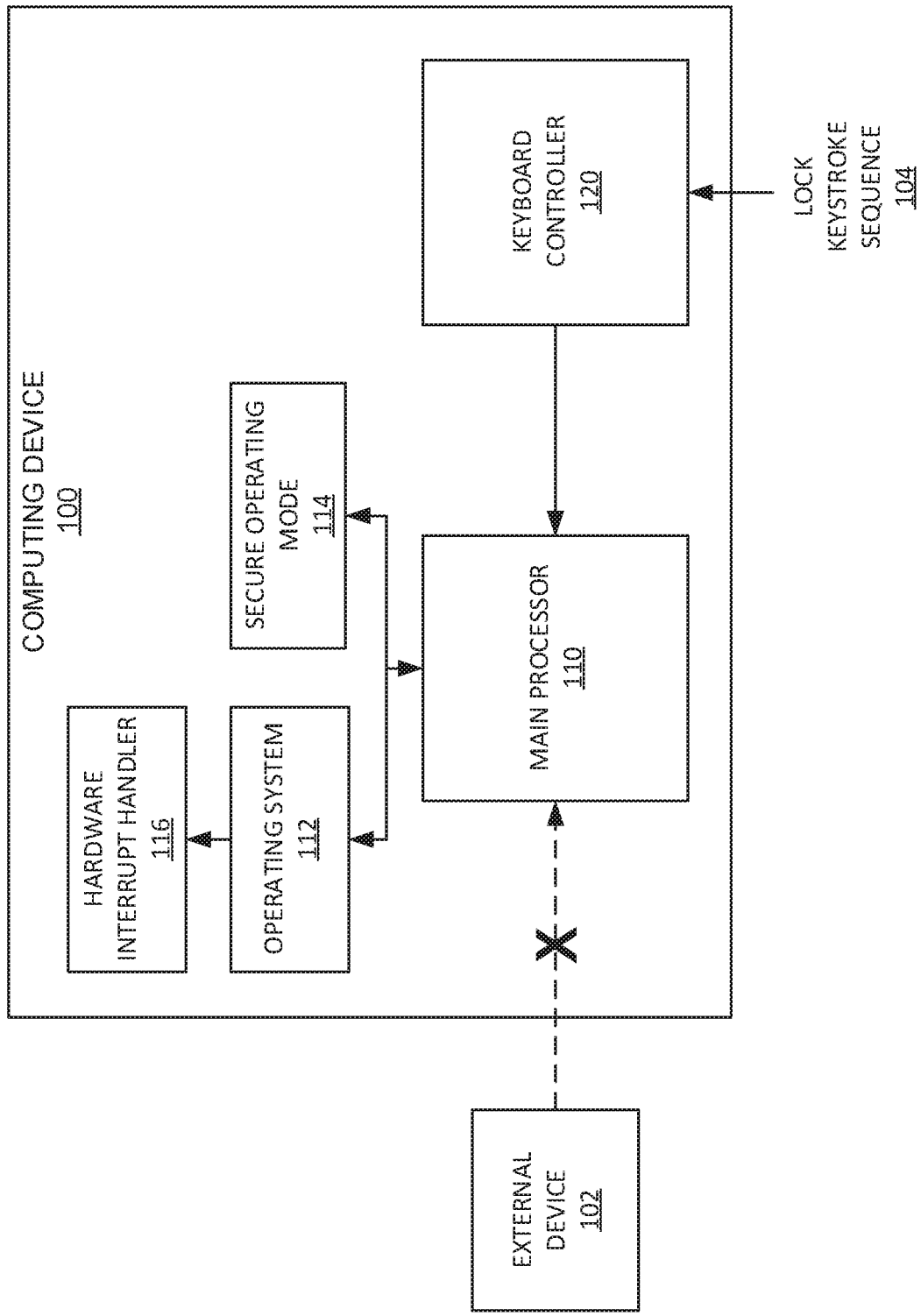
FIG. 1 is a schematic diagram of an example computing device with a keyboard controller that is to cause the computing device to enter a secure operating mode.

FIG. 1 is a schematic diagram of an example computing device 100. The computing device 100 includes a main processor 110 that runs an operating system 112 that enables the ordinary functions of the computing device 100. The main processor 110 is a processor that controls the primary functioning of the computing device 100, such as the central processing unit (CPU) of a desktop computer or notebook. The operating system 112 is enabled to establish communication from an external device 102 to the main processor 110 via a hardware interrupt handler 116 when the external device 102 is connected to the computing device 100. In the benign case, a communication from the external device 102 via the hardware interrupt handler 116 is not malicious. For example, the connection of the external device 102 to the computing device 100 may initiate hardware enumeration and setup of the drivers of the external device 102. The actions performed when the external device 102 is connected to the computing device 100 may be determined by instructions embodied in the hardware interrupt handler 116, which may be referenced by an interrupt descriptor table stored on the computing device 100 that is accessible by the operating system 112. Although a single hardware interrupt handler 116 is shown, it is to be understood that the operating system 112 may reference any of a plurality of different hardware interrupt handlers 116 upon the connection of different external devices 102 to the computing device 100.

The computing device 100 further includes a keyboard controller 120. The keyboard controller 120 receives inputs representing keystrokes typed into a keyboard connected to the computing device 100 and transmits scan codes corresponding to the keystrokes to the main processor 110.

When a sequence of keystrokes is entered that corresponds to a "lock" keystroke sequence 104, the keyboard controller 120 detects the lock keystroke sequence 104 and initiates activation of the secure operating mode 114. That is, in response to detecting the lock keystroke sequence 104, the keyboard controller 120 causes the main processor 110 to halt the operating system 112 and further causes the main processor 110 to enter the secure operating mode 114. The keyboard controller 120 may cause the main processor 110 to halt the operating system 112 and enter the secure operating mode 114 by transmitting an interrupt signal to an interrupt pin located on the main processor 110. In some examples, the main processor 110 may poll the keyboard controller 120 for such an interrupt signal.

For example, the main processor 110 may comprise an x86 central processing unit with a System Management Mode (SMM) pin that may be toggled to cause the main processor 110 to enter and exit the SMM. The SMM is an independent, isolated, and higher privilege execution mode of x86 central processing units, with code that is stored on secure memory (SMRAM) that is inaccessible to the operating system 112. The keyboard controller 120 may have direct hardware access to such an SMM pin. Thus, when the keyboard controller 120 detects the lock sequence, the keyboard controller 120 may transmit an interrupt signal to the SMM pin on the x86 central processing unit to cause the main processor 110 to operate in SMM. The SMM may be configured as described herein as the secure operating mode in which communication from the external device 102 to the main processor 110 via the hardware interrupt handler 116 is blocked.

The secure operating mode 114 suspends ordinary functionality of the computing device 100 that is available when the computing device 100 is running the operating system 112. For example, when in the secure operating mode 114, the main processor 110 may not be able to respond to any input signals from any peripheral devices (e.g. keyboard, mouse) connected to the computing device 100.

Further, in the secure operating mode 114, communication from the external device 102 to the main processor 110 via the hardware interrupt handler 116 is blocked. In other words, the establishment of communication from the external device 102 to the main processor 110 via the hardware interrupt handler 116 may be blocked. That is, when in the secure operating mode 114, the main processor 110 may reference an alternative interrupt descriptor table that references no instructions to execute when the external device 102 is connected to the computing device 100. Alternatively, the alternative interrupt descriptor table may reference instructions for execution that are benign or thwart the ability of the external device 102 to launch a security attack against the computing device 100. For example, the alternative interrupt descriptor table may reference instructions that log indications of attempts of external devices 102 to be connected to the computing device 100 (e.g. at the keyboard controller 120, in the secure memory that stores code for the secure operating mode 114, or elsewhere), but does not enable the external device 102 to access any memory of the computing device 100. Thus, malicious communication from the external device 102 to the main processor 110 is blocked.

The alternative interrupt descriptor table, and any other code to operate the secure operating mode 114, may be stored in secure memory that is not accessible to the operating system 112, and may therefore be protected from malicious attacks.

When in the secure operating mode 114, the computing device 100 may display a message through a display device or indicator light to indicate that the computing device 100 is in the secure operating mode 114. Thus, in some examples, the computing device 100 may include a display screen, and the keyboard controller 120 may cause the main processor 110 to write an indication to the display screen (e.g. through a frame buffer) that the computing device 100 is in the secure operating mode 114. In other examples, the computing device 100 may include an isolated indicator light that is inaccessible to the operating system 112, and the keyboard controller 120 may cause the main processor 110 to illuminate the isolated indicator light to indicate that the computing device 100 is in the secure operating mode 114. Thus, despite the secure operating mode 114 locking functionality of the computing device 100, a user of the computing device 100 may be informed that the computing device 100 is in the secure operating mode 114.

The main processor 110 may be released from the secure operating mode 114 upon the detection of an "unlock" keystroke sequence. That is, when the keyboard controller 120 detects an unlock keystroke sequence when the main processor 110 is in the secure operating mode 114, the keyboard controller 120 causes the main processor 110 to exit the secure operating mode 114 and resume the operating system 112. As when entering the secure operating mode 114, the keyboard controller 120 may cause the main processor 110 to resume the operating system 112 by transmitting an interrupt signal to an interrupt pin located on the main processor 110. In some examples, the main processor 110 may poll the keyboard controller 120 for such an interrupt signal.

Indications of the lock signal and the unlock signal may be stored at the keyboard controller 120 by programming during the boot sequence of the computing device 100. The lock and unlock signals may be stored early in the boot sequence, and locked during boot, to protect the lock and unlock signals from malicious attack. Further, code for the secure operating mode 114 may be initialized early in the boot sequence, and locked during boot, to be protected from malicious attack.

The secure operating mode 114 may be implemented as a layer of security on top of the security provided by a conventional lock screen. Thus, when the lock keystroke sequence 104 is detected, prior to causing the main processor 110 to enter the secure operating mode 114, the keyboard controller 120 may first cause the main processor 110 to lock the account running on the operating system and to adopt a conventional lock screen that prompts a user for a password before allowing access to the computing device 100. Thus, after the main processor 110 is released from the secure operating mode 114, a conventional lock screen continues to restrict access to the computing device 100 as an additional layer of security.

In some examples, the keyboard controller 120 may cause the main processor 110 to lock the account running on the operating system by transmitting scan codes corresponding to an account lock keystroke sequence to the main processor 110. In some examples, when the keyboard controller 120 detects the scan codes corresponding to the lock signal or the unlock signal, the keyboard controller 120 may withhold generating the corresponding scan codes, and instead, initiate the lock sequence or unlock sequence as described herein.

Figure 2:
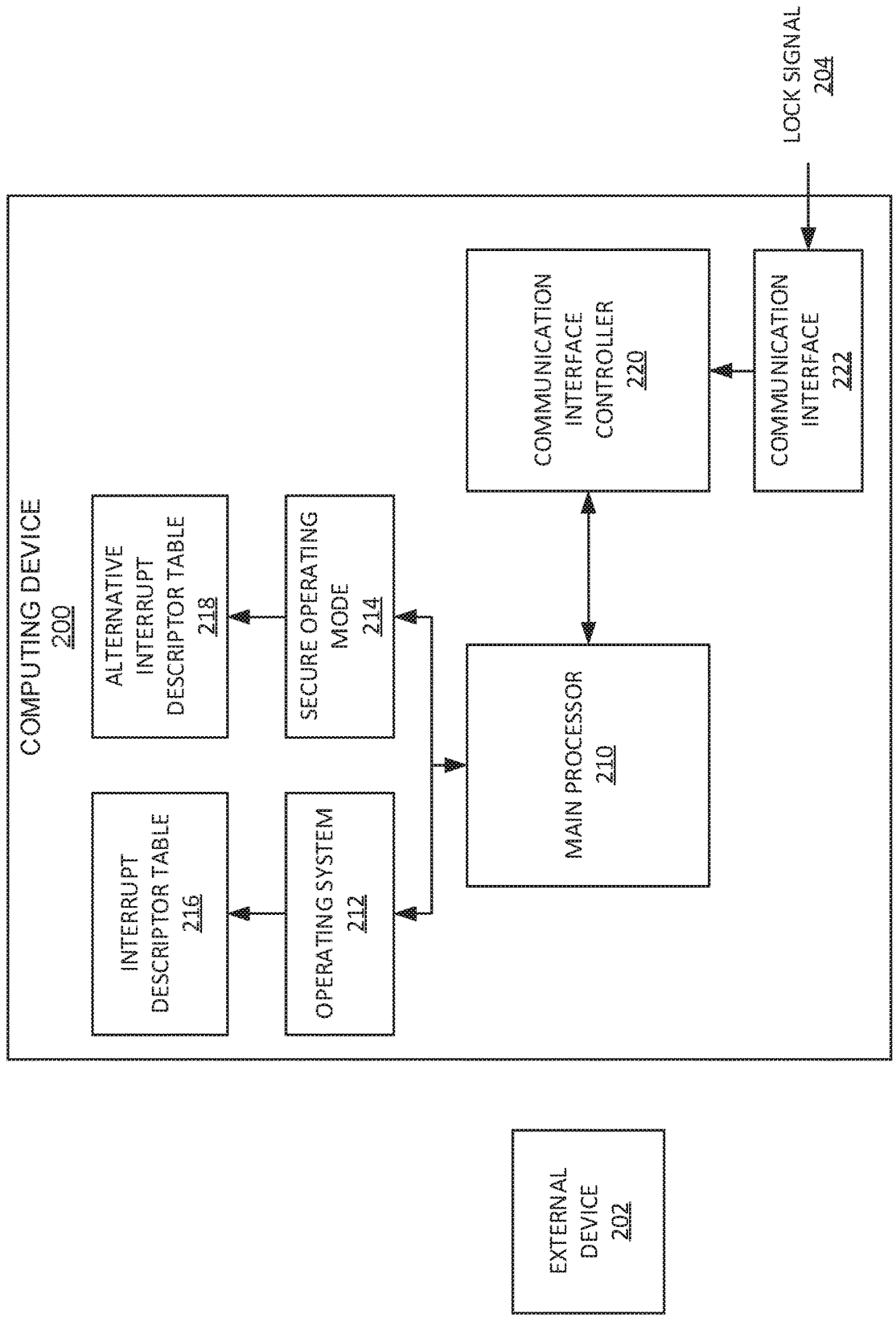
FIG. 2 is a schematic diagram of another example computing device with a communication interface controller that is to cause the computing device to enter a secure operating mode.

FIG. 2 is a schematic diagram of another example computing device 200. The computing device 200 is similar to the computing device 100 of FIG. 1, with like elements numbered in a "200" series rather than a "100" series, and thus includes a main processor 210 which runs an operating system 212 and a secure operating mode 214. An external device 202 may be connected to the computing device 200. For further description of the above elements, description of the computing device 100 of FIG. 1 may be referenced.

However, the computing device 200 further includes a communication interface controller 220 and a communication interface 222 coupled to the communication interface controller 220. The communication interface 222 may be any communication interface capable of receiving a "lock" and "unlock" input signal from human interaction or from a device that is external to the computing device 200. For example, the communication interface 222 may be similar to the keyboard from which the keyboard controller 120 of FIG. 1 which receives keystroke sequences as input signals. Thus, the communication interface 222 may include a keyboard or other hardware interface devices (HID), in which case, the input signals may be keystroke sequences or other human input. In other examples, the communication interface 222 may include a near-field communication receiver, in which case the input signals may be near-field communication signals. In other examples, the communication interface 222 may include a fingerprint scanner, in which case the input signals may be electronic signals including indications of fingerprint scans. In still other examples, the communication interface 222 may include a port to receive connection of a two-factor authentication Universal Serial Bus key. Thus, a hardware device may be used as a key to cause the computing device 200 to enter and exit the secure operating mode 214.

The communication interface controller 220 may be similar in function to the keyboard controller 120 of FIG. 1 and may include similar functionality as described with respect to the keyboard controller 120 of FIG. 1. Thus, in response to the communication interface 222 receiving a lock signal 204, the communication interface controller 220 causes the main processor 210 to halt the operating system 212 and enter the secure operating mode 214. The communication interface controller 220 may cause the main processor 210 to enter the secure operating mode 214 by directly toggling a pin on the main processor 210, such as, as described above with respect to the keyboard controller 120 of FIG. 1, the SMM pin on an x86 central processing unit.

When running the operating system 212, the main processor 210 references a main interrupt descriptor table 216 to obtain instructions to execute when the external device 202 is connected to the computing device 200. The main interrupt descriptor table 216 may reference a hardware interrupt handler for instructions to execute when the external device 202 is connected. The main interrupt descriptor table 216 may include a pointer to reference a particular hardware interrupt handler for execution.

However, when running the secure operating mode 214, the main processor 210 references an alternative interrupt descriptor table 218 when the external device 202 is connected to the computing device 200. The alternative interrupt descriptor table 218 references alternative instructions (e.g., alternative hardware interrupt handlers) for execution when the external device is connected to the computing device 200. In some examples, the alternative instructions may be null. That is, the alternative interrupt descriptor table 218 references a hardware interrupt handler that contains no instructions to execute when the external device 202 is connected to the computing device 200. Alternatively, the alternative interrupt descriptor table 218 may reference a hardware interrupt handler that contains instructions for execution that are benign or thwart the ability of the external device 102 to launch a security attack against the computing device 200. For example, the alternative interrupt descriptor table 218 may reference a hardware interrupt handler that contains instructions to log indications of attempts to connect external devices 202 to the computing device 200, but that do not enable the external device 202 to access any memory of the computing device 200. Further, the alternative interrupt descriptor table 218 may include a "whitelist" by which particular external devices 202 are permitted limited access to the computing device 200. For example, when such "whitelisted" or "trusted" external devices 202 are connected to the computing device 200, the main processor 210 may reference hardware interrupt handlers that allow the external devices 202 to access memory of the computing device, such as, for example as if the main processor 210 were running the operating system 212. The alternative interrupt descriptor table 218 may be stored on secure memory inaccessible to the operating system 212.

In response to the communication interface 222 receiving an unlock signal when the main processor 210 is in the secure operating mode 214, the communication interface controller 220 may cause the main processor 210 to exit the secure operating mode 214 and resume the operating system 212.

The lock signal 204 and unlock signal, whether in the form of NFC signals, keystroke sequences, fingerprint scans, or otherwise, may be stored at the communication interface controller 220 for reference to received input signals. In some examples, such as in the case where the communication interface 222 includes an NFC receiver, the communication interface 222 may be paired with the hardware device that acts as the key to provide the lock and unlock signals. Such pairing may take place during the boot sequence of the computing device 200.

FIG. 3 is a schematic diagram of an example non-transitory machine-readable storage medium 300 comprising instructions to cause a computing device to enter and exit a secure operating mode. The instructions stored on the storage medium 300 may be executed by a computing device as discussed herein, such as the computing device 100 of FIG. 1 or the computing device 200 of FIG. 2. However, this is not limiting, and the instructions stored on the storage medium 300 may be executed by other computing devices.

The storage medium 300 includes lock signal receipt detection instructions 310, interrupt signal transmission instructions 320, unlock signal detection instructions 330, and release signal transmission instructions 340.

The lock signal receipt detection instructions 310 are to detect receipt of a lock signal at a communication interface of the computing device. The interrupt signal may be transmitted via an interrupt pin of the main processor. An indication of the lock signal is stored at a communication interface controller for comparison to signals received at the communication interface. The indication of the lock signal may be stored during a boot sequence of the computing device.

The interrupt signal transmission instructions 320 are to transmit an interrupt signal to a main processor of the computing device to cause the main processor to enter a secure operating mode. Upon receipt of an indication that a new external device was connected to the computing device in the secure operating mode, the main processor is to reference secure memory to obtain instructions for execution in response to connection of the new external device. The secure memory may store an interrupt descriptor table that references hardware interrupt handlers containing instructions for execution.

The unlock signal detection instructions 330 are to detect receipt of an unlock signal at the communication interface. An indication of the unlock signal is stored at a communication interface controller for comparison to signals received at the communication interface. The indication of the unlock signal may be stored during a boot sequence of the computing device.

The release signal transmission instructions 340 are to transmit a release signal to the main processor to cause the main processor to exit the secure operating mode. The release signal may be transmitted via an interrupt pin of the main processor.

Figure 4:
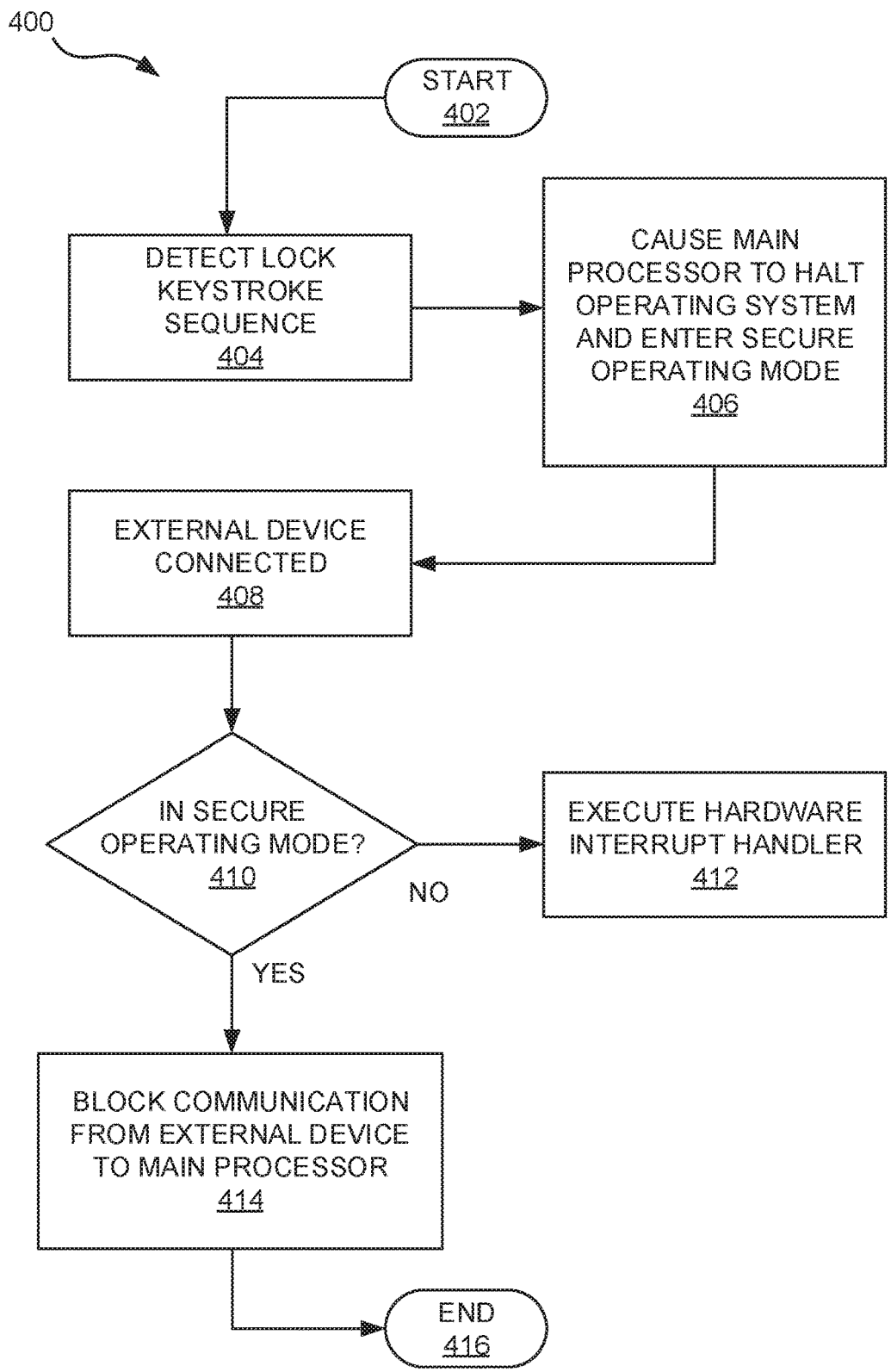
FIG. 4 is a flowchart of an example method of operation of a computing device in a secure operating mode.

FIG. 4 is a flowchart of an example method 400 which illustrates operation of a computing device in a secure operating mode. Further, one or more of the blocks of the method 400 may be embodied in instructions stored on a non-transitory machine-readable storage medium executable to cause a processor of a computing device to execute the method 400. For convenience, the method 400 is described with reference to the computing device 100 of FIG. 1, but the method 400 may be performed at other devices.

The method 400 begins at block 402. At block 402, the main processor 110 of the computing device 100 is running the operating system 112. At block 404, the lock keystroke sequence 104 is detected at the keyboard controller 120, indicating that a user of a keyboard connected to the keyboard controller 120 has entered in the lock keystroke sequence 104. At block 406, the keyboard controller 120 causes the main processor 110 to halt the operating system 112 and to enter the secure operating mode 114.

At block 408, the external device 102 is connected to the computing device 100. At block 410, the keyboard controller 120 determines whether the main processor 110 is running the operating system 112 or is in the secure operating mode 114.

If it is determined that the main processor 110 is not in the secure operating mode 114, then at block 412, a hardware interrupt handler is executed. The hardware interrupt handler that is executed may be determined by the main processor 110 running the operating system 112 referencing an interrupt descriptor table.

If it is determined that the main processor 110 is in the secure operating mode 114, then at block 414, communication from the external device 102 to the main processor 110 is blocked. Further, execution of the hardware interrupt handler 116 that otherwise would have been executed may be blocked. That is, the main processor 110 does not reference the interrupt descriptor table that may be referenced when the main processor 110 is running the operating system 112. Rather, the main processor 110 in the secure operating mode 114 may reference an alternative interrupt descriptor table that references either safe instructions or no instructions to execute when the external device 102 is connected to the computing device 100. The method 400 ends at block 416.

Thus, as described herein, computing devices may be provided with protection against unauthorized access from external devices when in a secure operating mode. The secure operating mode may be activated and released through a communication interface controller, such as a keyboard controller, which is isolated from the main processor of the computing device, and therefore is less vulnerable to interference from the connection of external devices to the computing devices.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A computing device comprising:
   a main processor to run an operating system enabled to establish communication from an external device to the main processor via a hardware interrupt handler when the external device is connected to the computing device; and
   a keyboard controller to:
   detect a lock keystroke sequence at a keyboard;
   transmit scan codes corresponding to the lock keystroke sequence to the main processor; and
   in response to detecting the lock keystroke sequence, cause the main processor to:
   lock a user account running on the operating system by presenting a lock screen that prompts a user for a password before allowing access to the computing device;
   halt the operating system, and
   enter a secure operating mode in which communication from the external device to the main processor via the hardware interrupt handler is blocked, wherein the secure operating mode is enabled to reference an alternative interrupt descriptor table, wherein the alternative interrupt descriptor table references alternative instructions for execution and wherein the alternative instructions referenced by the alternative interrupt descriptor table include instructions for the main processor to log indications of attempts by external devices to connect to the computing device.

2. The computing device of claim 1, wherein the keyboard controller is to:
   detect an unlock keystroke sequence at the keyboard when the main processor is in the secure operating mode; and
   in response to detecting the unlock keystroke sequence at the keyboard when the main processor is in the secure operating mode, cause the main processor to exit the secure operating mode and resume the operating system.

3. A computing device comprising:
   a main processor to run an operating system enabled to reference a main interrupt descriptor table, wherein the main interrupt descriptor table references instructions for execution when an external device is connected to the computing device;
   a communication interface to receive a lock signal; and
   a communication interface controller to, in response to the communication interface receiving the lock signal, cause the main processor to halt the operating system and to enter a secure operating mode, wherein the secure operating mode is enabled to reference an alternative interrupt descriptor table when the external device is connected to the computing device, wherein the alternative interrupt descriptor table references alternative instructions for execution when the external device is connected to the computing device and wherein the alternative instructions referenced by the alternative interrupt descriptor table includes instructions for the main processor to log indications of attempts of external devices to be connected to the computing device.

4. The computing device of claim 3, wherein:
   the communication interface is to detect an unlock signal when the main processor is in the secure operating mode; and
   the communication interface controller is to, in response to the communication interface receiving the unlock signal when the main processor is in the secure operating mode, cause the main processor to exit the secure operating mode and resume the operating system.

5. The computing device of claim 3, wherein the alternative interrupt descriptor table is stored on secure memory inaccessible to the operating system.

6. The computing device of claim 3, wherein:
   the computing device includes a display screen; and
   following the communication interface controller causing the main processor to halt the operating system and to enter the secure operating mode, the communication interface controller is to write an indication that the computing device is in the secure operating mode to the display screen.

7. The computing device of claim 3, wherein:
   the computing device includes an isolated indicator light inaccessible to the operating system, the isolated indicator light to indicate that the computing device is in the secure operating mode; and
   following the communication interface controller causing the main processor to halt the operating system and to enter the secure operating mode, the communication interface controller is to illuminate the isolated indicator light.

8. The computing device of claim 3, wherein the communication interface comprises a near-field communication receiver.

9. The computing device of claim 3, wherein the communication interface comprises a keyboard.

10. A non-transitory machine-readable storage medium comprising instructions to:
- detect receipt of a lock signal at a communication interface of a computing device;
- transmit an interrupt signal to a main processor of the computing device to cause the main processor to enter a secure operating mode, wherein upon receipt of an indication that a new external device was connected to the computing device in the secure operating mode, the main processor is to reference secure memory to obtain instructions for execution in response to connection of the new external device, wherein the interrupt signal is transmitted via an interrupt pin of the main processor, and wherein the instructions for execution in the secure memory include instructions for the main processor to log indications of attempts by external devices to connect to the computing device;
- detect receipt of an unlock signal at the communication interface; and
- transmit a release signal to the main processor to cause the main processor to exit the secure operating mode.

11. The non-transitory machine-readable storage medium of claim 10, further comprising instructions to store an indication of the lock signal, the indication of the lock signal provided during a boot sequence of the computing device.

* * * * *